US009879406B2

(12) United States Patent
De Garay Arellano

(10) Patent No.: US 9,879,406 B2
(45) Date of Patent: Jan. 30, 2018

(54) SYSTEM FOR USING WHITEWATER AND SOAPY WATER IN PLACES OF RESIDENCE

(76) Inventor: David Antonio De Garay Arellano, Estado de Mexico (MX)

(*) Notice: Subject to any disclaimer, the term of this patent is extended or adjusted under 35 U.S.C. 154(b) by 222 days.

(21) Appl. No.: 14/006,620

(22) PCT Filed: Mar. 23, 2012

(86) PCT No.: PCT/MX2012/000030
§ 371 (c)(1),
(2), (4) Date: Sep. 20, 2013

(87) PCT Pub. No.: WO2012/128605
PCT Pub. Date: Sep. 27, 2012

(65) Prior Publication Data
US 2014/0008279 A1    Jan. 9, 2014

(30) Foreign Application Priority Data
Mar. 23, 2011   (MX) .................... MX/a/2011/003089

(51) Int. Cl.
*E03C 1/02* (2006.01)
*E03B 1/04* (2006.01)
*E03D 5/00* (2006.01)

(52) U.S. Cl.
CPC .............. *E03C 1/023* (2013.01); *E03B 1/041* (2013.01); *E03B 2001/045* (2013.01); *E03D 5/003* (2013.01)

(58) Field of Classification Search
CPC ... E03B 1/041; E03B 2001/045; E03D 5/003; E03D 5/006; E03C 1/023
See application file for complete search history.

(56) References Cited

U.S. PATENT DOCUMENTS

| 4,554,688 A | 11/1985 | Puccerella |
| 5,106,493 A | 4/1992 | McIntosh |
| 5,165,456 A | 11/1992 | Woolman |
| 5,277,218 A | 1/1994 | Sanchez |
| 5,287,570 A | 2/1994 | Peterson et al. |
| 5,341,529 A | 8/1994 | Serrano |
| 5,445,146 A | 8/1995 | Bellinger |

(Continued)

FOREIGN PATENT DOCUMENTS

| DE | 19519209 A1 * | 12/1996 | ............... C02F 3/04 |
| ES | 1 035 963 U | 7/1997 | |

(Continued)

OTHER PUBLICATIONS

International Search Search Report for International Patent Application No. PCT/MX2012/000030, dated Oct. 17, 2012, 8 pages.

*Primary Examiner* — Terry K Cecil
(74) *Attorney, Agent, or Firm* — Defillo & Associates, Inc.; Evelyn Defillo

(57) ABSTRACT

The invention relates to an integrated system for saving whitewater and using soapy water in washrooms mainly in housing and especially to be used in bathrooms wherein both the whitewater and drinking water is saved in an integral manner and the soapy water generated from washing under the shower and/or in the bath is used. The invention also relates to elements for collecting, storing, filtering and pumping the soapy water, as part of the system, for using same in the cleaning of bathroom furniture and other general uses.

3 Claims, 5 Drawing Sheets

(56) References Cited

U.S. PATENT DOCUMENTS

| | | | |
|---|---|---|---|
| 5,794,643 A | 8/1998 | Brice | |
| 5,862,544 A | 1/1999 | Placencia | |
| 5,941,504 A | 8/1999 | Toma et al. | |
| 7,927,481 B2 * | 4/2011 | Martinello | E03D 5/003 |
| | | | 210/114 |
| 2002/0148915 A1 | 10/2002 | Sasaki et al. | |

FOREIGN PATENT DOCUMENTS

| | | |
|---|---|---|
| ES | 2 187 348 A1 | 6/2003 |
| GB | 588694 A | 5/1947 |
| MX | 164908 A | 10/1992 |
| MX | 181159 B | 3/1996 |
| MX | 181169 B | 3/1996 |
| MX | 736 | 10/1999 |
| MX | 251376 B | 11/2004 |
| MX | 1923 | 10/2008 |
| WO | WO 2008/111778 A1 | 9/2008 |
| WO | WO 2011/105883 A1 | 9/2011 |

* cited by examiner

SYSTEM FOR USING WHITEWATER AND SOAPY WATER IN PLACES OF RESIDENCE

TECHNICAL FIELD OF THE INVENTION

The present invention is related to toilets, sinks, and hydraulic installations for bathrooms. More specifically, the present invention relates to systems to use and save clear or whitewater from toilets, sinks and, showers used in housing. The present invention is an improvement to save clean water in houses and for helping to save water by using it efficiently and responsibly.

BACKGROUND OF THE INVENTION

The present invention is related to a system that saves clean or whitewater in sanitation, mainly in houses. The water is saved to be used in the bathrooms, taking advantage of the use of clear grey or soapy water generated in the showers instead of drinking, clear, or whitewater.

Mainly, the present invention is related to improvements and implements made to the receptor device, flow and control devices, and filter system for soapy water obtained in the showers.

In the state of the art devices are shown having as a common denominator the recovering or reuse of the cold water from the showers or other hydraulic devices which use and handle warm water, including storing and leading it to containers. The water that normally is wasted with these containers is allowed to be in sinks for sanitary use or in some cases recycling water to heaters. However, none of these known inventions which are described solves comprehensibly an additional aspect: to use soapy water from showers to save clear or drinking water used normally in bathrooms. This water normally is discharged toward a drain, nevertheless, the quality and quantity of this water allows to give an additional use, such as for bathrooms and toilets. This action allows the opportunity to save water from the shower and also save and reuse soapy water to use in toilets when normally clear water is used every time the toilet is flushed. The present invention substantially reduces the use of clear and drinking water.

The prior art shows devices or hydraulic systems to save water which are directed to efficiently dispense such fluid in specific applications, such as patent MX 164908. This reference describes a hermetic box containing water to be dispensed toward the toilet. The water drops down under pressure and saves the water in the bathroom. However, this reference does not solve the problem of saving water at all by reusing soapy water from the showers.

In the case of the reference MX1923, an hydraulic arrangement is described whereby cold water from the shower is diverted toward a container to be used in toilets later. The arrangement is regulated through valves until the water temperature dropping by the shower is comfortable for users, saving cold water.

Mexican Patent 251376 refers to a system for saving hot water, which operates between the water heater and the shower, the bathroom, or the kitchen sink. The reference describes a recirculating system of cold and hot water, which by using an electro-mechanical system allows an automatic operation using an electronic system and temperature and water flow sensors. Using such electronic and electromechanical systems seems not as trustworthy to be used in dwellings. This invention only saves clear or drinking water, which comes from the water heater toward showers or sinks in bathrooms or kitchens, sending water to another deposit to be used in toilets or sinks.

There are other systems to save water that have the same or similar functionality, to save water coming from showers. For example the U.S. Pat. No. 4,554,688 refers to a system that saves water flowing under certain temperatures, and includes a solenoid control valve controlled by a set of temperature sensors, and a water pump which recirculates cold water toward the water heater. This invention also recirculates and saves clear water, improving water heater performance.

The U.S. Pat. No. 5,165,456 describes a system to save cold water in showers that comprises a cold and clear water receptor and a set of valves that allows to store cold water in a deposit to be reused later.

Other systems include hydraulic accessories by which the user can choose to use water from the heater to either a shower or to a receiving vessel, thus, the user can direct the cold water, preventing water wastage that otherwise would go to the drain without being used. Such is the case of U.S. Pat. Nos. 5,277,218 and 5,941,504. Their references use microprocessors including recirculation or pressure sensors, such as those shown in U.S. Pat. Nos. 5,287,570 and 5,794,643, with which such control is achieved by taking advantage of differential flows and temperature pressures. All these references are efficient in concept but only refer to the clear water recirculation. The electronic and sensor systems are often complex.

Another reference is U.S. Pat. No. 5,862,544 in which accessories have been incorporated next to the shower that permits to store clear water to use later.

Also, there are references focused in recycling soapy water to be used in bathrooms, such as the case of the Mexican Utility Model MX736. The soapy water goes toward outdoor deposits. Also, Mexican Patents MX 181159 and 181169, that corresponds to the U.S. Pat. Nos. 5,341,529 and 5,445,146 respectively, describe a system to recirculate soapy water toward the toilet. However, they disclose complex systems that have to be adapted to W.C. tank, thus, these references are not reliable and can only reuse soapy water.

In spite of all these options described, all these references are directed to get and reuse just one kind of water; cold water, which is in all cases clear, or drinking water that comes from a main tank installed in houses or apartment buildings, that has passed from the water heater to the shower. None of these cases provides the option to get another kind of water that is generated in bathrooms like soapy water, which quality permit users reuse in convenient ways in toilets.

Patent application PCT/MX2010/000015, integrates a system for saving clear water and use of gray water from baths including: a system for the collection and use of cool water from a water heater that is diverted to at least one collection or deposit system as the water is cold, a collection system of clear cold water, which is fed by a system until the water reaches a comfortable temperature for the user; a system for the use of the clear, cold water as a source of drinking water or clear water, a system to divert hot water from the heater to the shower for bathing service, a system of collection and pumping of soapy water that is produced by the user during bathing at least one storage tank of soapy water, a system for use in medical devices such as soapy water, and toilets and cleaning of service areas.

SUMMARY OF THE INVENTION

According the present invention, there is an improvement in the collection and pumping system of soapy water that is generated in the shower. The present invention improves the use and quality of this kind of water, by recirculating, filtering, and handling soapy water, to save and reuse the water used in a bathroom and the shower.

Therefore the objective of the present invention is to save and use, in an efficient way, water from bathrooms to be adaptable in an easy and inexpensive way for installation in existing and new buildings, without complex sanitary installation; electronic systems or microprocessors would be required.

Another objective of the present invention is to provide a system that permits to reuse and save clear and drinking water from showers and sinks into bathrooms.

Another objective is to provide a system for integrated soapy water produced from baths or showers, tubs, or both, and even the sink itself, mainly using this water to feed toilet or other household uses.

As also is aimed to provide a system that allows full use of different qualities of water in a bathroom.

Yet another objective of the present invention is to provide a system for utilization and saving water which avoids the complete or partial waste of water, which is initially clear (drinking) and subsequently soapy showers and/or personal use tubs or collective bathrooms.

Yet another of the objectives of the present invention is to provide a system of manifolds and reservoirs that can be installed in any bathroom that has a shower without altering the hydraulic and/or sanitary pre-existing installations.

Yet another additional objective of the present invention is to provide a circulating pumping scheme and improvement that allows greater efficiency in the use of water recovered and recycled in the system objective of the present invention.

These and further objectives of the present invention may be best appreciated and in more detail in the following description and the accompany figures, following the same reference numbers for indicating parts thereof.

DETAILED DISCLOSURE OF THE INVENTION

The characteristic details of this novel system according to the present invention are shown in the following description and the accompanying figures, following the same reference numbers for indicating parts thereof.

The present invention relates to a system that saves clear water and partially or totally recycles soapy water. As it has been previously indicated, the present invention solves essentially two issues, which are wasting clear and drinking water as the water in the shower gets to the comfort temperature of the user and wasting the water when it is dropped on the shower. The system of the present invention reuses as much as 90% of the water used in the shower. The system of the present invention can be installed in any type of bathroom having a shower or a tub. As a result of this, the present invention helps to save drinking water and recycle soapy water.

Figure 1:
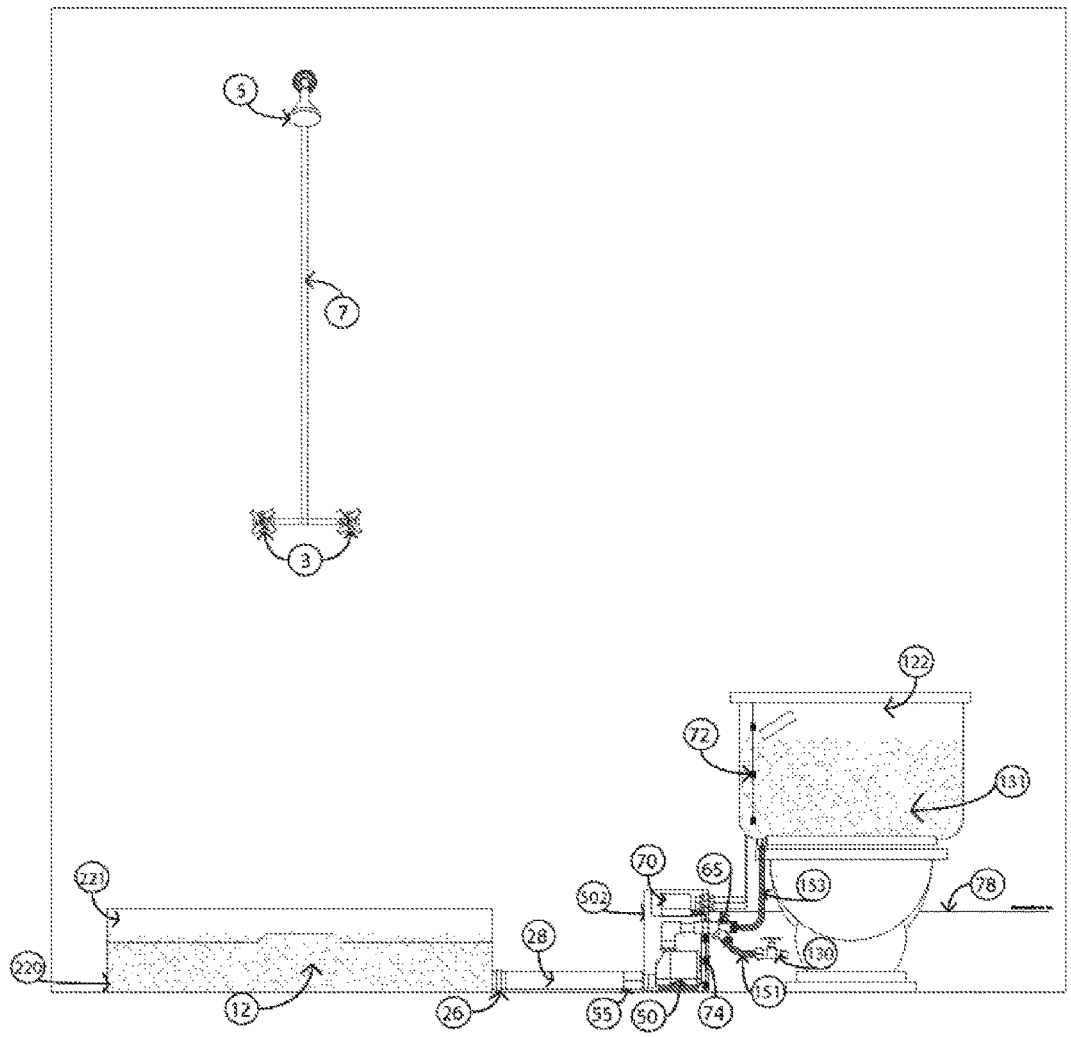
FIG. 1 shows a diagram of the preferred embodiment of the system according to the present invention.

According to what is shown in FIG. 1, which is a non-limiting embodiment of the present invention, the hydraulic system is interconnected by water lines based on rigid or flexible pipes.

In accordance, the reference will now be made to each one of the typical components that comprise the system to some embodiments thereof and their respective functionality.

The system is intended to pick not only clear water coming out of the shower, but also take the soapy water from the shower or a bathtub or both, in order to use this soapy water or water in the sanitary toilet or W.C. The water flows through the control line (7) that comes from a general reservoir tank or water service (not shown). Thus, clear water flow into the shower is controlled by the flow valves (3), such that by opening said control valves the clear water circulates in the common feeding tube (1). According to what is shown in FIG. 1, the water flows from the shower and is captured by a reservoir system or metal tray (220), which is preferably placed under a platform where the user stands up to bathe. The reservoir or metal tray (220) captures the soapy water that is generated by the user during the bathing process. In one embodiment not shown, instead of the shower and bath tray, the system may be provided with bath and power systems to the bath and/or showers. The system of the present invention can operate similarly to the respective settings, with a tub instead of a shower or both of them. The present invention can be placed on existing bathroom systems by just adjusting the necessary components, keeping the main target of the system that is to capture soapy water and to reuse it.

Thus, the soapy water (12) captured by the tray (220) is conducted by the output line (26) into the conduit (28) and from there to the suction pump (50). The figure shows a pump (50) which can be electrically, mechanically or can even be a water driven turbine. In accordance with the present invention, the embodiment being described is a system of electric suction pumping.

Said suctioned soapy water may be provided with filter elements in order to prevent the passage of objects which cause damage to the pump (50). Also according to an embodiment of the present invention, the system can include an electro levels system adjusted so that it may be an element of control in operating of the pump (50) and to permit it to stop in the event that the soapy water contained in the reservoir or in the bathtub runs out. Moreover, and in order to discharge the soapy water that the user does not wish to reuse, the tray or tub (220) may be equipped with a conventional valve or pedal that is activated to allow the soapy water to flow into the drainage. The spillway system will be described later. Soapy water that is sucked by the pump (50), flows upward through the line (153) to the toilet tank (122) containing soapy water (131). In an embodiment, the system includes one or more one way valves (check valve) (151) to prevent the return of the soapy water to the pumping system and/or to the deposit or reservoir of soapy water.

The pumping soapy water system can have an electro level system (72, 70, 74) installed in different levels according to the capacity of the toilet tank (122) and the capacity of the pump (50). These elements efficiently control the water levels. In addition, the system may include an air freshener device (non shown) that is connected to the pump

(50) via a conduit (78). Furthermore, the system may include an ionizer (not shown) that is connected to the pump (50) via a line (55).

Figure 2:
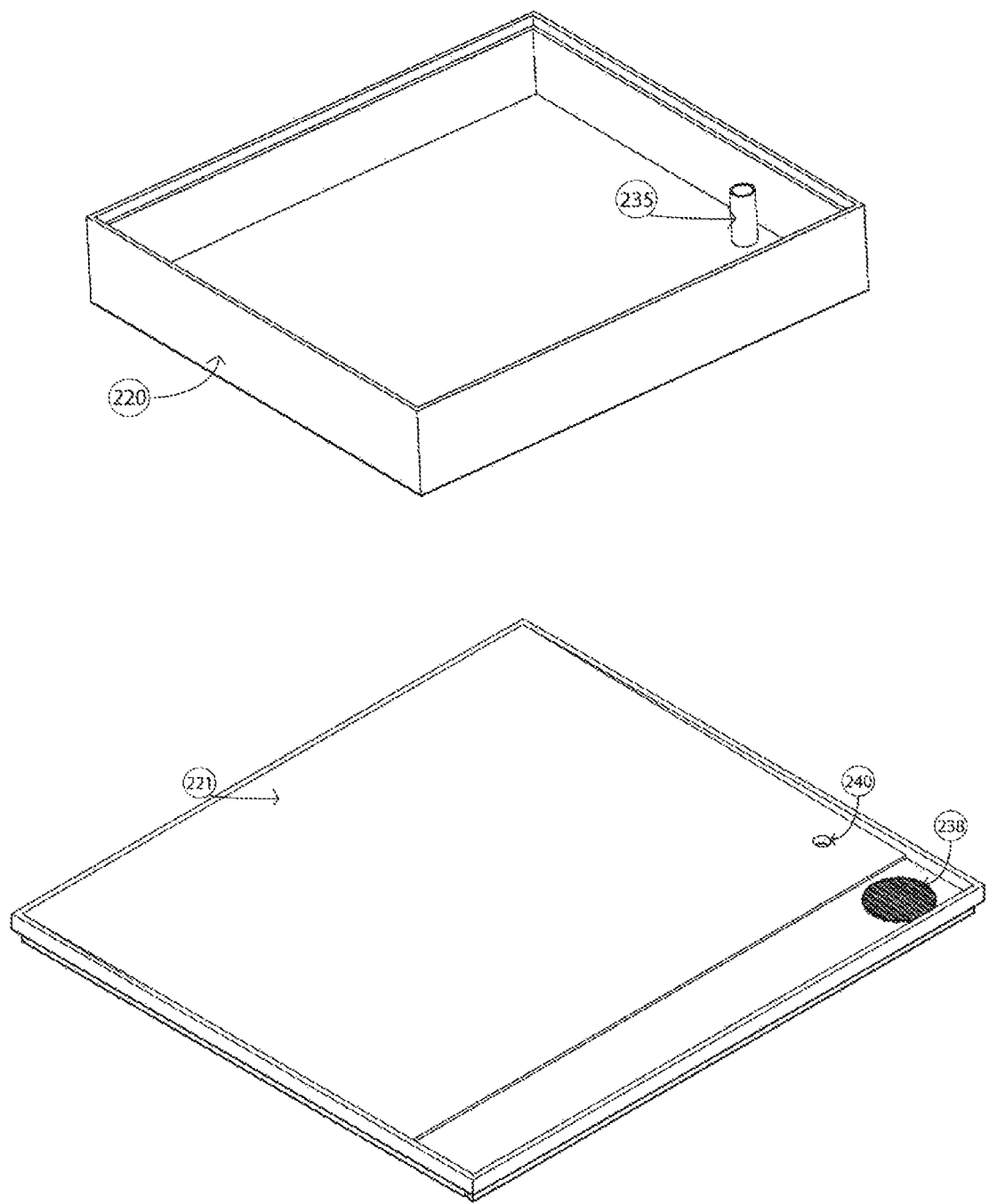
FIG. 2 shows an expanded view of a soapy water collecting tank of the present invention showing a reservoir or metal tray and a lid.

According to FIG. 2, a cover tray (221) and reservoir system or metal tray (220) is illustrated. Both of these two elements can be built with different measures in order to fit into the shower or tub floor. The reservoir system or metal tray (220) with standard measures will be set in a horizontal way on the shower floor. The cover tray (221) and reservoir system or metal tray will capture the soapy water generated when the user takes a shower. After that, the soapy water is pumped toward the toilet tank (122). The reservoir system or metal tray (220) will capture the soapy water which is going to enter through a floor drain (238) set on the cover tray (221). The shape of the reservoir system or metal tray (220) will avoid odors coming out. In addition, the reservoir system or metal tray (220) has an overflow (235) which functions when the reservoir system or metal tray (220) gets full. The leftover soapy water flows through overflow (235) toward the drain. Also, the cover tray (221) provides an air vent element (240).

Figure 3:
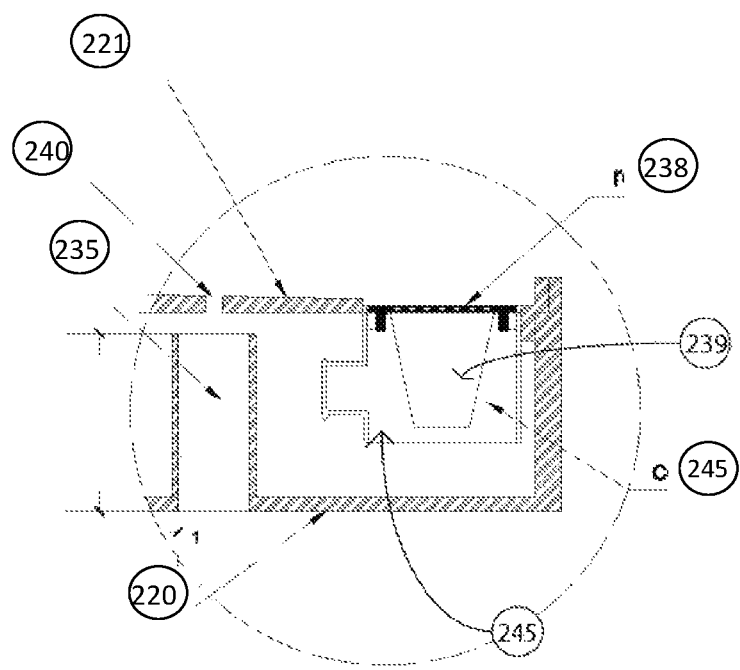
FIG. 3 shows a detailed view of the soapy water floor drain in the reservoir or metal tray of FIG. 2.

FIG. 3 shows a detail of a preferred embodiment of the floor drain (238), which is assembled or coupled on the cover tray. The floor drain (238) has a round grid; through this grid soapy water flows toward the cone (239) of the floor drain. The soapy water is led to a vase (245) which is going to lead the fluid into the filtering system (177), which is illustrated in FIG. 5; the filtering system is installed into the reservoir system.

Figure 4:
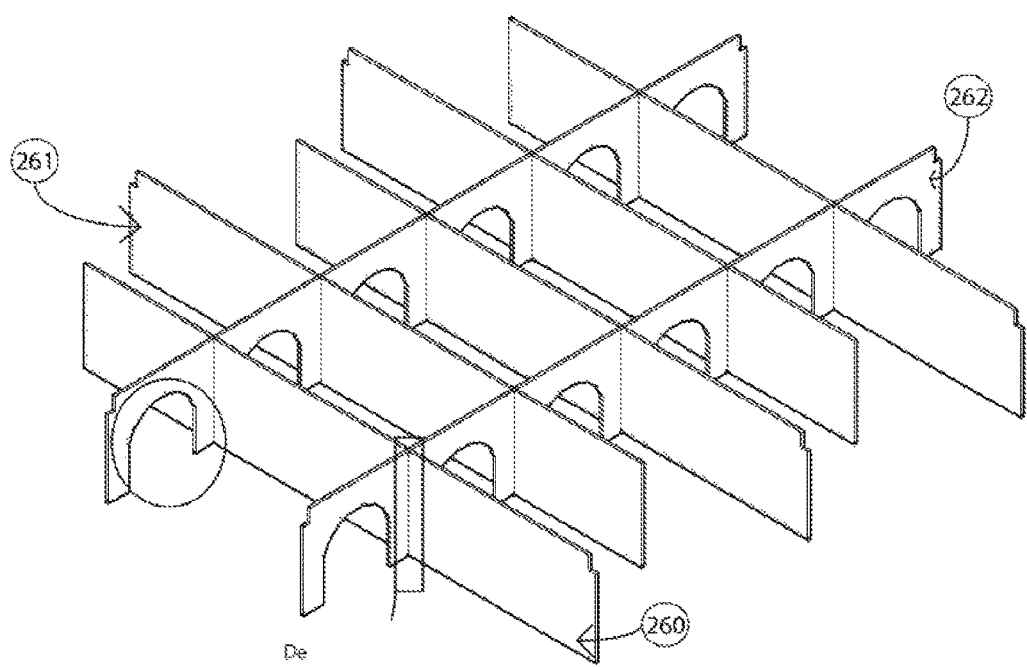
FIG. 4 shows a perspective front view of a supporting frame inside the collection tank or reservoir of soapy water according to the present invention.

According to FIG. 4, inside the reservoir system or metal tray (220) is positioned a supporting structure (260) to provide rigidity. The supporting structure (260) maintains a suitable spacing across its elements 261 and 262, so it can house the filter element (177) and the soapy water to flow through the same. Other functions of the internal structure of the reservoir system or metal tray (220) is to ensure the stability of the cap and the weight of the user or person who is under the shower or taking a bathroom shower.

Figure 5:
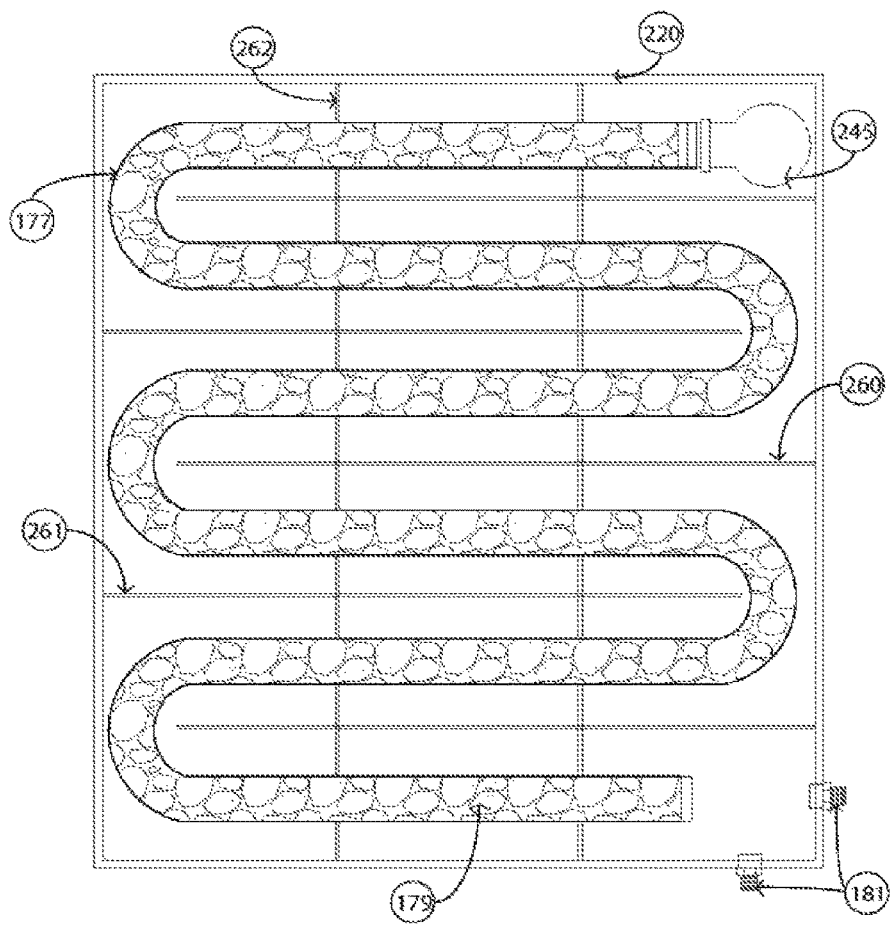
FIG. 5 shows a front view filtering system of the collecting container or reservoir of soapy water according to the present invention.

FIG. 5 shows a detailed view of the filter element (177) that includes coils of flexible rubberized material containing inside materials or mixture of filter materials. The material can be either natural or stone, plastic, activated charcoal, or any other known filtering material. This filter element serves to filter the captured soapy water from the shower and bath to remove as much solid material as possible, and any other soapy material that is required to remove, and which may result in clogging pipelines and therefore damaging several elements of the pumping system. It is necessary to comment that the system of the present invention can function perfectly well without the filter element placed in the tray and instead can use other filtering mechanisms or even without them, without the spirit of the invention being modified.

A more specific embodiment of operating the system of the present invention and according to all described figures, includes at soapy water uptake in the reservoir system or metal tray (220) and the operation of an electric motor (50) which serves to pump the soapy water captured in the reservoir of the system and to put to reuse destination, directly to the tank of the toilet tank (122). The system would capture the water from the moment that user opens the mixing faucets or valves (3), the water will run through the common supply line (7) existing the shower head coming out of the shower (5). The water will be captured by the reservoir system or metal tray (220) to enter through the gridded floor drain (238) that is in the tank cover (221). Then, the soapy water will enter into a vessel (245) which is connected to the filtration system and that includes a filtering element (177) that achieves its path with the aid of a supporting grid that contains a stone material (179) through which passes the captured soapy water for the shower and remains within the reservoir system or metal tray (220) for reuse in discharging into the toilet tank (122) by connecting the soapy water tank (220) to the pumping system (50) for any output (181) of the tank. The electro levels system, that is located within the pump unit (50), includes a remote control and two sets of sensors. The control knob is placed in automatic mode, while one of the sets of sensors (74) is installed in the container of the pumping unit and while the other set (72) is installed inside the case of the toilet tank. The sensors send the signal for activating the motor (50) and thus sucking soapy water (12) from the reservoir system or metal tray (220) to move the soapy water to the toilet tank (122). This system will work automatically, making our invention to be practical, functional and comfortable for the user, thereby not consuming large amounts of electrical energy.

The installation includes that the reservoir system or metal tray (220) is placed in the shower floor, and it will connect to the pump (50) preferably with PVC tubes of about 1 inch. The pump (50) has a flow deflector (65) with two outputs approximately 0.5 inches with a router button, while the outputs are connected at flexible tubing (151) having a size of an 0.5 inch diameter, one of which is connected to the toilet tank and the other to supply clean water.

The water feed to the unit will require a bypass valve (130), in case there is none previously installed. The bypass valve (130) prevents the clear water to go to the toilet tank that feeds the toilet tank. This allows the equipment to choose the use of clear and soapy water to feed the toilet tank (122). It is also expected that not having water stored in the reservoir system or metal tray (220), with flow to the deflector (65), will change the direction of the water inlet and open the bypass valve (130) to feed the unit with the system traditional gravity from the main service water tank. In this way, the user can have the original hydraulic system with the installation of basic equipment soapy water recycling of the present invention.

We have disclosure of a preferred embodiment of our invention which permits to reuse 90% of soapy water generated during a shower; this captured water is going to be used in the toilet instead of using clear water, saving drinking or clear water.

It is important to mention that the present disclosure has illustrated the operation and installation of the clean and soapy water use system in the same room (bathroom). With this invention, the captured soapy water can be reused not only in toilets, if not also for other uses; such as bathrooms which do not have showers or tubs or even to store soapy water for use to clean floors. According to this distribution, number and kinds of deposits for clear and soapy water can be different sizes, have different locations, proportions and regulation systems. Also, this system can be useful to take advantage of different water sources with different qualities. These kinds of water can come from several places, for example; we can capture soapy water generated in laundry rooms (washing machines or hand washer) to be reused in toilets or for doing general cleaning.

The present invention can use different pumping elements, current pumps or some could be developed in the future, with the purpose to save not only water, but also energy. It is possible to use gravity effects taking advantage of the water pressure and water flow, as well as turbines and interconnected pumps can be adapted to this system. We can even use alternative energy sources like solar energy. All these options to help this invention to be more efficient. However, we should consider all these alternatives must be integrated to our system under the basis of our invention.

What is claimed is:

1. An integrated system for saving clear water and use of soapy water from baths, the system comprising:
   a reservoir adapted to be placed on a floor of a bathtub or a shower, the reservoir captures soapy water before leaving through a drain hole located on the floor of the bathtub or the shower;
   a supporting structure located underneath of the reservoir;
   a cover tray located above the reservoir, the cover tray including a drainage and a vent hole, the drainage including a grid cover, a cone shaped reservoir placed underneath of the grid cover, and a vase housing the cone;
   a filtering system located inside the supporting structure, the filtering system is connected to the vase of the cover tray;
   a first conduit including a first end connected to an output of the filtering system and a second end connected to a pump, the soapy water runs through the grid cover, the cone, the vase, the filtering system, and then exits through the output end of the filtering system into the first conduit until the soapy water reaches the pump;
   a second conduit having a first end attached to an out end of the pump and a second end connected to a toilet tank, the pump pumps the soapy water through the second conduit and into the toilet tank;
   an electro level system including sensors located at various points between the pump and the toilet tank, the electro level system controls a level of the soapy water in the toilet tank.

2. An integrated system for saving clear water and use of soapy water from baths, the system comprising:
   a reservoir adapted to be placed on a floor of a bathtub or a shower, the reservoir captures soapy water before leaving through a drain hole located on the floor of the bathtub or the shower;
   a supporting structure located underneath of the reservoir;
   a cover tray located above the reservoir, the cover tray including a drainage and a vent hole, the drainage including a grid cover, a cone shaped reservoir placed underneath of the grid cover, and a vase housing the cone;
   a filtering system located inside the supporting structure, the filtering system is connected to the vase of the cover tray;
   a first conduit including a first end connected to an output of the filtering system and a second end connected to a pump, the soapy water runs through the grid cover, the cone, the vase, the filtering system, and then exits through the output end of the filtering system into the first conduit until the soapy water reaches the pump;
   a second conduit having a first end attached to an out end of the pump and a second end connected to a toilet tank, the pump pumps the soapy water through the second conduit and into the toilet tank;
   an electro level system including sensors located at various points between the pump and the toilet tank, the electro level system controls-a level of the soapy water on the toilet tank, wherein the filtering system includes tubular coils filled with a filtering material selected from the group consisting of a stone material, a natural material, an activated charcoal, and a plastic.

3. The system according to claim 1, wherein the electro level system includes two sensors located outside a casing of the pump, a sensor located inside the toilet tank, and a remote unit, the electro level system activates the pump to start pumping the soapy water from the reservoir.

* * * * *